United States Patent [19]
Horn

[11] Patent Number: 6,024,391
[45] Date of Patent: Feb. 15, 2000

[54] COOKING UTENSIL

[75] Inventor: Lois Horn, Southbury, Conn.

[73] Assignee: LoRu, LLC., Southbury, Conn.

[21] Appl. No.: 09/039,040

[22] Filed: Mar. 13, 1998

[51] Int. Cl.[7] .................................................. A47J 43/28
[52] U.S. Cl. .................. 294/7; 294/8; D7/688; 30/169
[58] Field of Search .............. 294/7, 8; 30/169, 30/136; 15/236.01; D7/688, 368, 669, 393, 395

[56] References Cited

U.S. PATENT DOCUMENTS

| | | | |
|---|---|---|---|
| D. 31,935 | 12/1899 | Smith | D7/688 X |
| D. 32,918 | 7/1900 | Ericson . | |
| D. 187,079 | 1/1960 | Horn et al. . | |
| D. 192,018 | 1/1962 | McLeod | D7/688 X |
| 1,728,211 | 9/1929 | McClellan | 294/7 X |
| 1,801,672 | 4/1931 | Knowles | 294/7 X |
| 2,551,877 | 5/1951 | Ditto . | |
| 3,730,579 | 5/1973 | Mock . | |
| 3,758,143 | 9/1973 | Godlewski . | |
| 3,759,165 | 9/1973 | Wallace . | |
| 3,761,120 | 9/1973 | Binkert . | |
| 3,796,454 | 3/1974 | Williamson et al. | 294/7 |
| 3,858,320 | 1/1975 | Neal et al. | 30/323 |
| 3,906,632 | 9/1975 | Oppenheimer . | |
| 5,573,292 | 11/1996 | Citino | 294/7 |

*Primary Examiner*—M. Rachuba
*Assistant Examiner*—T. Anthony Vaughn
*Attorney, Agent, or Firm*—Ohlandt, Greeley, Ruggiero & Perle

[57] ABSTRACT

A cooking utensil is comprised of a substantially flat blade, having elongated side edges, an elongated central axis and relatively narrow ends; and a handle connected to the blade near or at one of the ends of the blade, and near or on the central axis of the blade, the handle being disposed either vertical to the plane of the blade, or at an acute angle relative to the plane of the blade and oriented toward one of the side edges of the blade. The cooking utensil can include a shield to protect the handle from heat and splashed or splattered liquid arising from the cooking surface or food item.

4 Claims, 2 Drawing Sheets

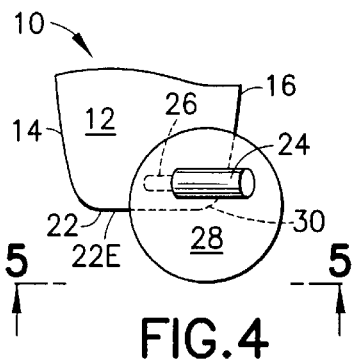
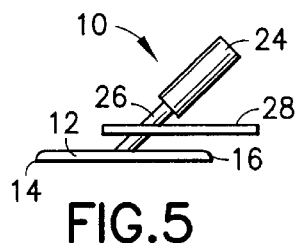
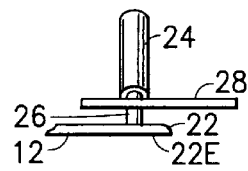
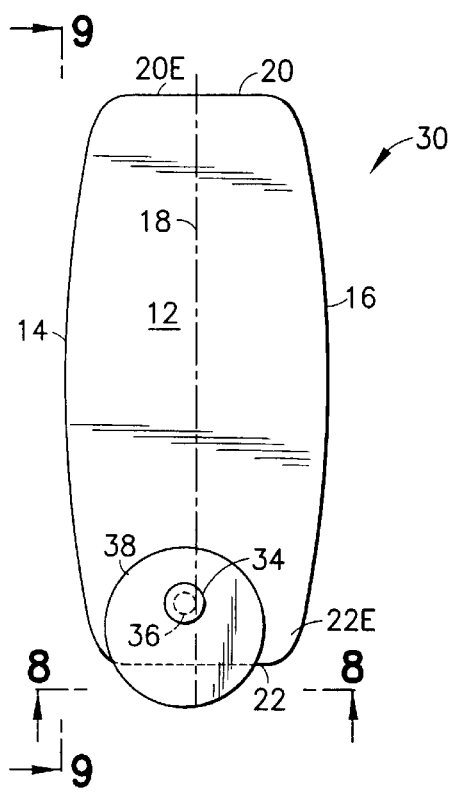
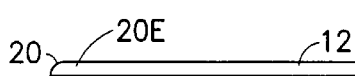
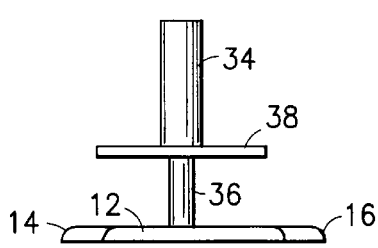

COOKING UTENSIL

FIELD OF THE INVENTION

This invention relates to cooking utensils. More particularly, this invention relates to cooking utensils for removing delicate food items from cooking surfaces, and for inverting such food items and depositing them onto cooking or other surfaces.

BACKGROUND OF THE INVENTION

Certain food items, particularly delicate ones such as fish steaks, filets and croquettes are difficult to lift and remove from cooking surfaces such as frying pans, grills and barbecue surfaces, and to invert and deposit onto cooking and other surfaces such as serving trays, platters and cutting boards. These food items when partly or fully cooked, tend to break up easily during one or more of such maneuvers. Such delicate food items tend to lack cohesiveness and can stick to and be difficult to remove in one piece from their cooking surfaces, for example, if the foods are over-cooked or lack juices, or if the foods are not displaced and/or inverted sufficiently to prevent sticking to these surfaces.

Conventional cooking utensils employing a flat blade are often ineffective because the blades are not wide enough or long enough to fully engage and fully support fish steaks or other delicate foods. Also, it can be difficult to use conventional cooking utensils to lift delicate food items in one piece from and invert and deposit them in that condition onto cooking and other surfaces because the utensils are designed such that rotation of the utensil occurs about axis of the handle, rather than about the longitudinal central axis of the blade itself.

Thus, heretofore, there has not been a satisfactory cooking utensil for easily lifting partly or fully cooked delicate food items from cooking surfaces and for inverting and depositing them in one piece onto cooking and other surfaces.

SUMMARY OF THE INVENTION

It is an object of this invention to provide a cooking utensil which overcomes one or more of the above difficulties and facilitates the lifting of certain food items, particularly delicate ones, such as cooked fish steaks, filets and croquettes, from cooking or other surfaces.

Another object of this invention is to provide such an aforementioned cooking utensil which facilitates lifting of such food items in one piece and inverting and depositing them in that condition onto cooking and other surfaces.

Still another object of this invention is to provide such an aforementioned cooking utensil which permits lifting and carrying of the entirety of such food items with substantial balance thereof on the utensil.

Still another object of this invention is to provide such an aforementioned cooking utensil having a substantially flat blade, wherein the utensil is designed to effect inversion of a food item resting on the blade, by rotation of the blade about its central axis.

Yet another object of this invention is to provide such an aforementioned cooking utensil which employs a shield to protect a user's hand from heat and splashed or splattered liquids from the cooking surface or food item.

The above and other objects and advantages are provided by the cooking utensil of this invention which facilitates lifting food items from and inverting them onto cooking and other surfaces. The cooking utensil is comprised of a substantially flat blade having an upper surface, elongated side edges, an elongated central axis, and relatively narrow ends, and an elongated handle connected to the blade near or on its central axis and near or at one of its ends, the handle being disposed at an acute angle relative to the upper surface of the blade and being oriented toward one of the side edges of the blade. The orientation of the handle preferably is from about 45 to 15 degrees, more preferably from about 90 to 135 degrees, and most preferably about 90 degrees, relative to the longitudinal central axis of the blade. The handle preferably is connected to the blade by a shaft, and preferably is connected to the blade on the central axis of the blade. The cooking utensil can include a shield preferably disposed generally parallel to the plane of the blade, to protect the handle from heat and splashed or splattered liquid from the cooking surface or food item. Preferably, one end of the blade is a forward end distally removed from the handle, the other end of the blade is a back end proximate the handle, and the shield is offset relative the handle, such that a minor portion of the shield overlies the blade forward of the handle and a major portion of the shield is disposed to the rear of the handle and extends beyond the back end and/or beyond a side edge of the blade.

In an alternative embodiment of the cooking utensil of the invention, the handle is disposed perpendicular to the blade.

BRIEF DESCRIPTION OF THE DRAWINGS

FIG. 4 is a top plan view with portions broken away of the utensil shown in FIG. 1 modified to include a shield.

FIG. 5 is an end view of the utensil shown in FIG. 4 as it would be seen along line 5—5 of FIG. 4.

FIG. 6 is a side elevational view of the utensil shown in FIG. 4 as it would be seen along line 6—6 of FIG. 4.

FIG. 7 is a top plan view of another embodiment of a cooking utensil of this invention.

FIG. 8 is an end elevational view of the utensil shown in FIG. 7 as it would be seen along line 8—8 of FIG. 7.

FIG. 9 is a side elevational view of the utensil shown in FIG. 7 as it would be seen along line 9—9 of FIG. 7.

DETAILED DESCRIPTION OF THE DRAWINGS

Figure 1:
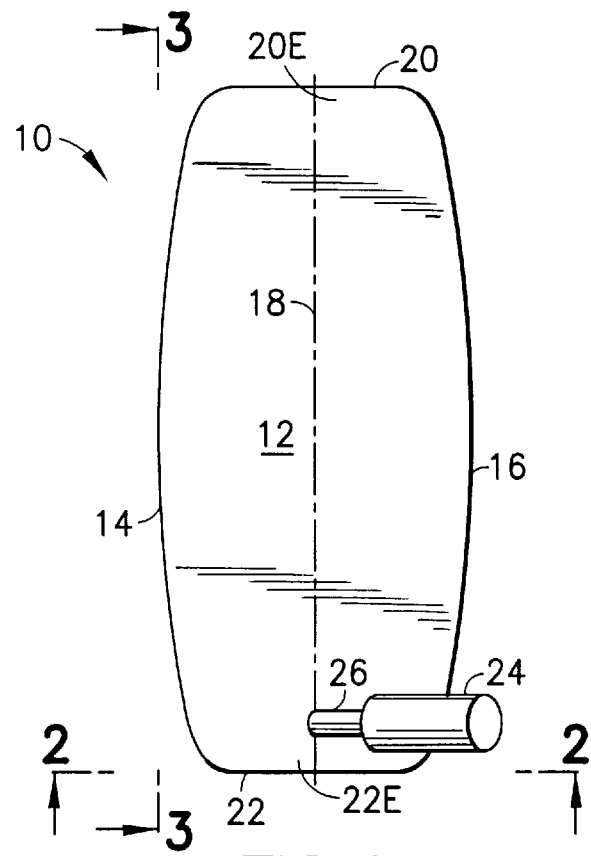
FIG. 1 is a top plan view of a preferred embodiment of the cooking utensil of this invention.
Figure 2:
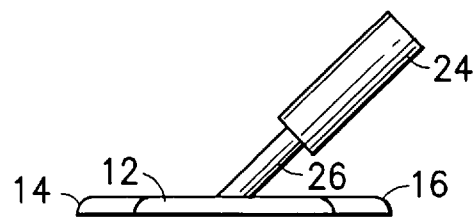
FIG. 2 is an end elevational view of the utensil as it would be seen along line 2—2 of FIG. 1.
Figure 3:
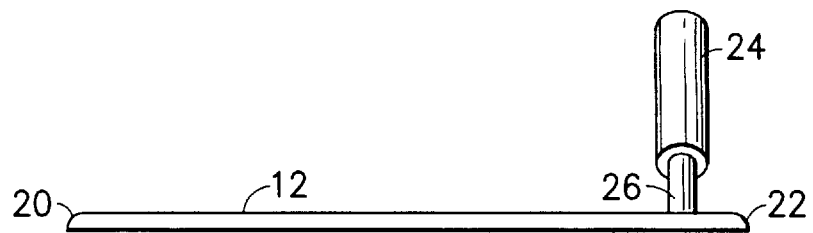
FIG. 3 is a side elevational view of the utensil as it would be seen along line 3—3 of FIG. 1.

FIG. 1 shows a preferred embodiment of the cooking utensil of this invention, generally designated 10, comprised of an elongated substantially flat blade 12 having elongated side edges 14, 16, an elongated central axis or center line 18 and narrow front and back ends 20, 22, which are relatively narrow compared to side edges 14, 16. Cooking utensil 10 includes an elongated handle 24 which is shown connected by a shaft 26 to the blade 12 on its central axis 18 and near its back end 22. As shown in FIGS. 1, 2 and 3, handle 24 is disposed at an acute angle, preferably from about 35 to 85 degrees relative to the plane or upper surface of blade 12. As also shown in these Figures, handle 24 is oriented in a direction toward a side edge, here side edge 16, of blade 12. More particularly, the orientation of handle 24 is such that it has a directional component which is in a direction toward a side edge. FIGS. 1–3 show handle 24 oriented in a direction that is about 90 degrees relative to central axis 18. Handle 24 can be oriented at any suitable angle ranging from about 45 to about 135 degrees, more preferably about 90 to about 135 degrees, and most preferably about 90 degrees relative to central axis 18. FIGS. 1–3 also show that the edges, preferably the upper surfaces adjacent the edges of blade 12 are beveled to facilitate insertion of the blade under a food item to be lifted from a cooking surface.

FIGS. 4–6 are views of the cooking utensil shown in FIGS. 1–3, modified to include a shield, generally designated 28, to protect the handle, more particularly a person's hand (not shown) on handle 24, from heat and from splashed or splattered liquids arising from a cooking surface or food item (neither of which are shown). FIGS. 4 and 6 show that shield 28 preferably is offset relative to handle 24, such that a minor portion of the shield overlies blade 12 forward of handle 24, i.e., in the direction of front or forward distal end 20E of the blade which is removed from handle 24, and such that a major portion of shield 28 is disposed to the rear of the handle and extends beyond back end 22E of the blade which is proximate handle 24. FIGS. 4 and 5 show that shield 28 preferably is also offset relative to shaft 26 and toward side edge 16 such that the shield underlies handle 24 and extends beyond side edge 16, rounded comer 30 and back edge 22. FIGS. 5 and 6 show that preferably shield 28 is connected to shaft 26 between blade 12 and handle 24 and is disposed roughly parallel to the upper surface of blade 12.

FIGS. 7–9 show another embodiment of the cooking utensil of this invention, here generally designated 32, comprised of an elongated substantially flat blade 12 as in FIG. 1 and including an elongated handle 34 connected by a shaft 36 to the upper surface of blade 12, just to the side of, here to the left of, its central axis 18 and near its back end 22. As shown in FIGS. 7–9, handle 34 is disposed perpendicular to blade 12, and a shield 38 is connected to shaft 36 between handle 38 and blade 12 to protect the handle, i.e., a person's hand, from heat and liquid from a cooking surface or food item. As shown, preferably shield 38 is located just under handle 34 and it is disposed generally parallel to the plane of blade 12. Similar to shield 28 of FIG. 1. shield 38 of FIGS. 7–9 is offset relative to handle 34 toward back end 22E of blade 12, such that a minor portion of the shield overlies blade 12 forward of handle 34, a major portion of the shield is disposed to the rear of handle 34, and a portion of the shield extends beyond back end 22E. While shield 38 is concentric relative to handle 34 and to shaft 36, since shaft 36 is connected to blade 12 to the left of its central axis 18, shield 38 is offset to the left of central axis 18 of blade 12.

The cooking utensil of this invention can be made of any suitable material or combination of materials. It can be made in one piece or of separate members or components joined or connected by any suitable means, methods and materials. Although it is preferred that the utensil be made of stainless steel, particularly the blade and the shaft for connecting the handle to the shaft, the utensil can be made of one or more polymeric materials, preferably high melt temperature ones, which will withstand cooking and sterilization or wash temperatures.

Blade 12 can be made of a rigid, substantially rigid or partly flexible material. The shaft preferably is substantially rigid, meaning it can have some flexibility, so long as it is suitable for the purposes intended, including to transmit the forces applied to the handle to the blade, e.g., to move it along a cooking or other surface, and to support the food item carried thereon without twisting or bending which might cause the item to slip off of the blade. The shaft and/or handle desirably have heat insulating properties to prevent excessive heat from being transferred therethrough to a user's hand. Particularly if a shield is not employed, the shaft should be long enough to position the handle a sufficient distance from the blade so as to minimize exposure to excessive heat or to splashed or splattered liquids from the cooking surface or food item.

The cooking utensil can be of any suitable size, shape and dimension. The blade must by wide and long enough to carry the entire fish steak or food item to be carried on or manipulated with the utensil. The blade must be strong enough to support the food item carried thereon, but thin enough to slide easily under the food item so that it can be easily lifted without break-up of the food item.

The handle can be of any suitable, length, width or diameter and it can be of any suitable shape, so long as its central axis is, in the preferred embodiment, oriented toward a side edge of the blade, and is disposed at an acute angle relative to the plane or upper surface of the blade 12. Such an acute angle permits the handle to be grasped by a hand palm-up to facilitate comfortably pushing or sliding the blade under a food item in a direction along or at an angle to the central axis of the blade, and importantly, to facilitate fully inverting the food item and depositing it on a surface, by turning the hand toward or in front of the holder's body from the palm-up to a palm-down position, this permits the blade to be easily and comfortably rotated about its central axis from a horizontal, 180 degree position to a substantially inverted roughly 135 degree position. In the second embodiment of the cooking utensil of this invention wherein the handle is disposed substantially vertical to the plane of the blade, when the hand is rotated toward or in front of the body from a palm-to-the-side position, the blade is rotated less, for example, roughly only 180 degrees to a roughly perpendicular position relative to the cooking surface.

The handle preferably is connected to the blade toward or at the back end of the blade so that the blade will provide a large uninterrupted surface area and so that the handle will not interfere with the inversion of the foot item supported on the blade.

As shown, the handle preferably is a separate piece from the blade and is connected to the blade by any suitable means. While not shown, it is contemplated that all or a portion of the back end 22E of the blade can be bent upward, say substantially vertical to the horizontal plane of the blade and the handle can be connected to the upwardly bent portion of the blade. Also, the upper vertical portion of the blade can be formed into a shield. For example, the upper vertical portion can be bent forward a short way over the blade and then bent in the reverse direction back over itself and beyond the back end 22E of the blade to form an integral horizontal shield, and the handle can be mounted onto the shield. The handle can be connected to the blade by one or more shafts or connecting members which can be integral with or separate from the handle. Preferably there is one shaft and preferably it is connected to the blade on the central axis of the blade.

The shaft can be of any suitable shape. It can be bent and oriented in multiple directions and it can be connected by various means to the blade. The shaft can be connected to the blade by any suitable means such as by welding, fasteners or adherents. Preferably, the shaft is joined or connected to the blade at or on the central axis of the blade for optimum balance and ease of lifting, maneuvering and inversion of the food item on the blade. However, though less preferred, as shown with respect to the second embodiment, the shaft or handle can be joined or connected to the blade near or off of the central axis. The further the connection is from the central axis, and the closer it is to the side of the blade, the sooner that side of the blade will be removed from under the food item when the handle and blade are rotated about the central axis in a direction toward that side of the blade.

The shield of this invention can be integral with or separate from the handle, shaft, blade or any or all of them. For example, the shield can be molded of a polymeric material integrally with the handle and/or shaft, or as previously explained, it can be integral with the blade. When the shield is a separate piece, it can be connected to the handle shaft or blade by any suitable means such as by welding, fasteners or adherents. The shield should be positioned such that it does not overlie a large portion of the blade or otherwise does not interfere with the placement of a food item on or the inversion of a food item from the blade. The shield can be of any suitable size, shape, thickness or dimension.

Although the size, shape, dimensions, and arrangement of components of the cooking utensil of the invention can vary within the scope of the invention, it has been found that a preferred cooking utensil of this invention is comprised of a stainless steel blade which is from about 7 to about 8.5 inches long, at least about 3, preferably about 4 inches wide, about 1/32 inch or less thick, and has elongated convex substantially parallel side edges formed by a radius which is at least about 20, preferably about 25 inches long; a handle which is at least about 3.5 inches, preferably about 4 inches long and is from about 3/4 to 1 1/4 inches in diameter; a shield which is made of about 0.015 inch thick stainless steel, and is in the form of a disc of about 3 inches in diameter, and which extends about 1 inch forward of the handle; and a stainless steel shaft which is long enough to position the handle and shield at least about 1.5 inches above the blade.

Having thus described the cooking utensil of this invention with particular reference to preferred embodiments thereof, it will be apparent that various changes and modifications may be made therein without departing from the spirit and scope of the present invention as defined in the appended claims.

What is claimed is:

1. A cooking utensil for lifting a food item from and for inverting it onto a cooking surface, which comprises:

a substantially flat blade having an upper surface, elongated side edges, an elongated central axis, and front and back ends, and an elongated handle connected to the blade at about a central axis thereof and adjacent said back end, the handle being disposed at an acute angle relative to (i) the upper surface of the blade and (ii) a perpendicular plane extending from said upper surface and passing through said central axis, said handle thereby slanted toward one of the side edges of the blade.

2. The cooking utensil of claim 1 wherein the handle includes a shield to protect the handle from heat and splashed or splattered liquid from the cooking surface or food item.

3. The cooking utensil of claim 2 wherein the shield is disposed generally parallel to the plane of the blade.

4. The cooking utensil of claim 2 wherein one end of the blade is a forward end distally removed from the handle, the other end of the blade is a back end proximate the handle, and the shield is offset relative the handle, such that a minor portion of the shield overlies the blade forward of the handle and a major portion of the shield is disposed to the rear of the handle and extends beyond the back end and beyond a side edge of the blade.

\* \* \* \* \*